No. 766,105. PATENTED JULY 26, 1904.
B. B. FLOYD.
GRAVITY RAILWAY.
APPLICATION FILED JUNE 26, 1903.
NO MODEL. 4 SHEETS—SHEET 1.

WITNESSES:
H. L. Cheesman
H. Gamble

INVENTOR
Byron B. Floyd
BY A. P. Groves
ATTORNEY.

No. 766,105. PATENTED JULY 26, 1904.
B. B. FLOYD.
GRAVITY RAILWAY.
APPLICATION FILED JUNE 26, 1903.
NO MODEL. 4 SHEETS—SHEET 2.

WITNESSES: INVENTOR
Byron B Floyd,
BY
A. V. Groupe
ATTORNEY.

No. 766,105. PATENTED JULY 26, 1904.
B. B. FLOYD.
GRAVITY RAILWAY.
APPLICATION FILED JUNE 26, 1903.
NO MODEL. 4 SHEETS—SHEET 3.
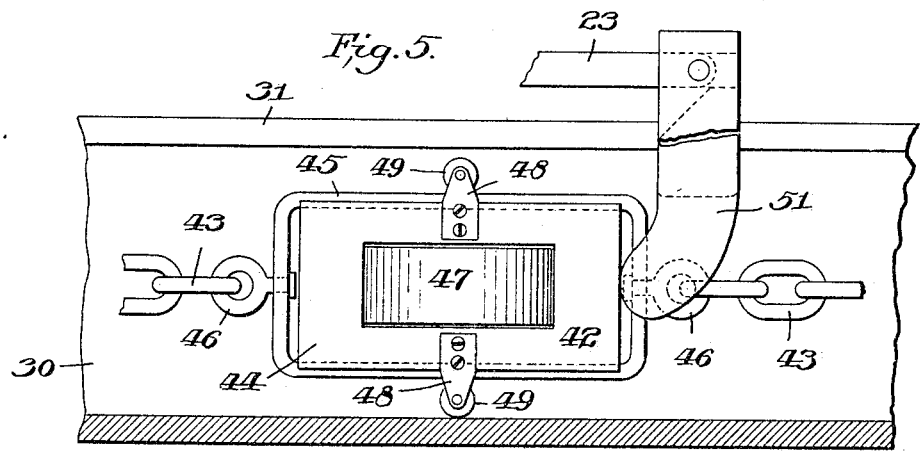
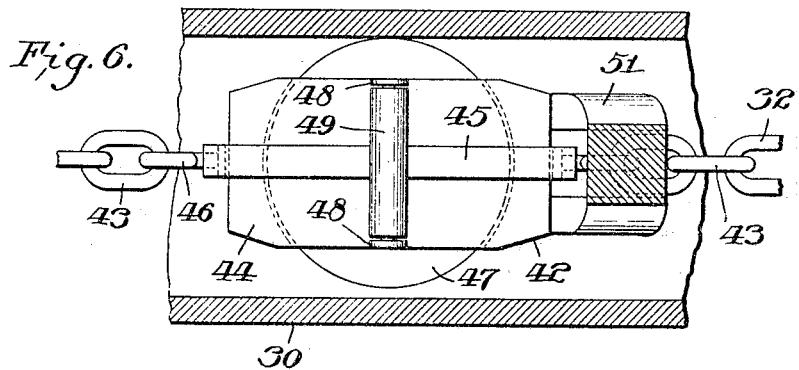
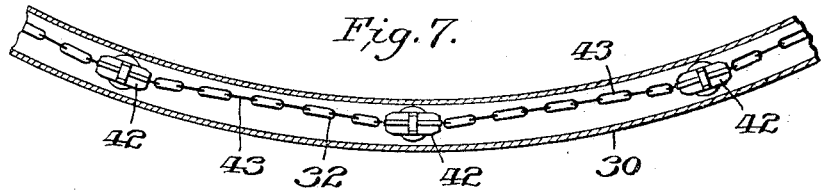
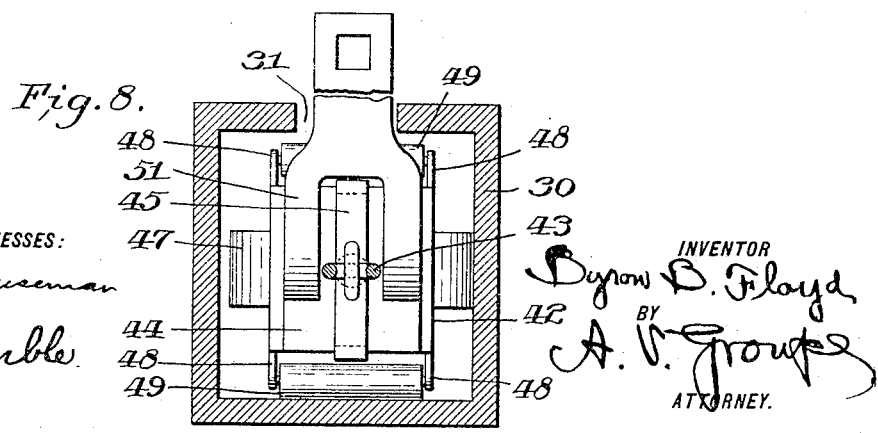

No. 766,105. PATENTED JULY 26, 1904.
B. B. FLOYD.
GRAVITY RAILWAY.
APPLICATION FILED JUNE 26, 1903.
NO MODEL. 4 SHEETS—SHEET 4.
Fig. 9.
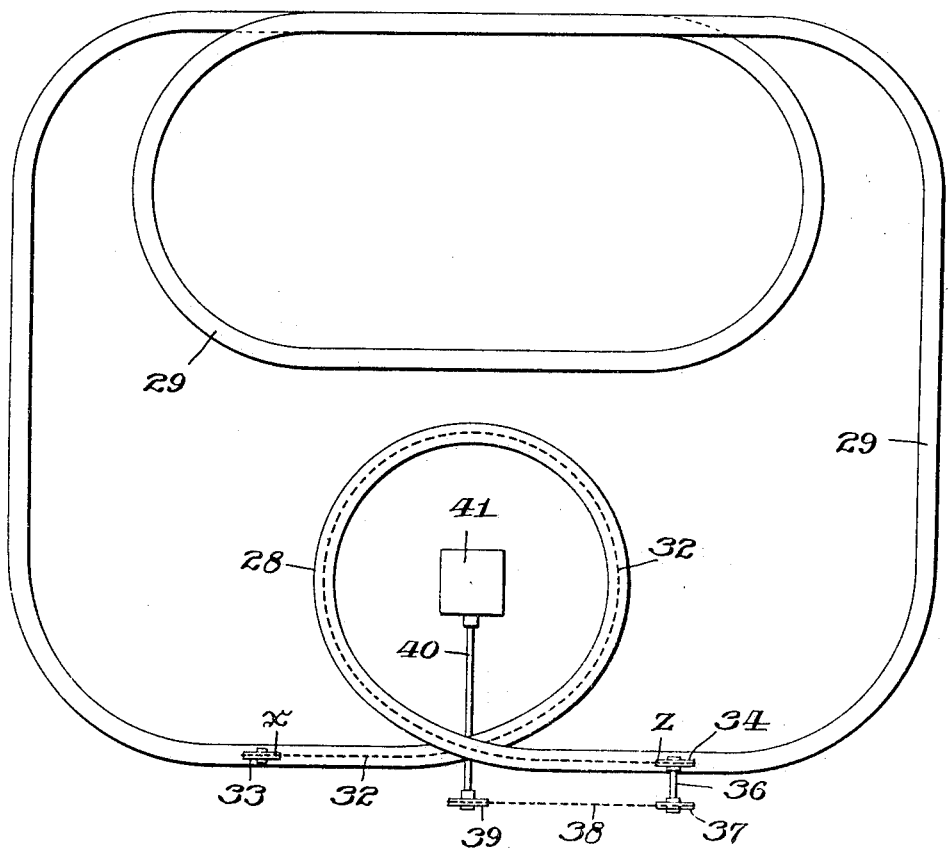
Fig. 10.
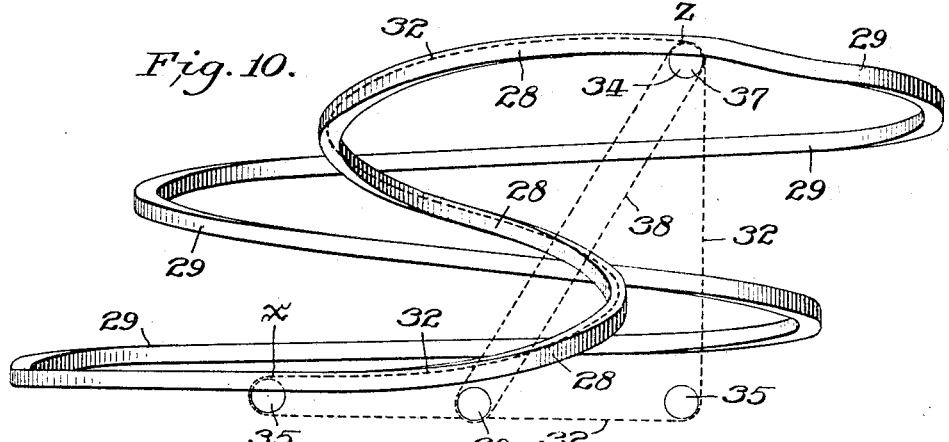
WITNESSES: 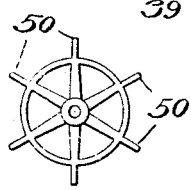 INVENTOR
H. L. Cheeseman Byron B. Floyd
H. Gamble Fig. 11. Fig. 12. BY A. V. Groupe
ATTORNEY No. 766,105.                                    Patented July 26, 1904.

UNITED STATES PATENT OFFICE.

BYRON B. FLOYD, OF ATLANTIC CITY, NEW JERSEY, ASSIGNOR TO PHILADELPHIA AMUSEMENT COMPANY, A CORPORATION OF NEW JERSEY.

GRAVITY-RAILWAY.

SPECIFICATION forming part of Letters Patent No. 766,105, dated July 26, 1904.

Application filed June 26, 1903. Serial No. 163,175. (No model.)

*To all whom it may concern:*

Be it known that I, BYRON B. FLOYD, a citizen of the United States, residing at Atlantic City, in the county of Atlantic and State of New Jersey, have invented certain new and useful Improvements in Gravity-Railways, of which the following is a specification.

This invention relates to gravity-railways, its object being to provide, first, a novel construction and configuration of trackway; secondly, a simple and efficient construction of carriage adapted to run on said trackway, and, thirdly, a simple and efficient means for moving the carriages up the elevating incline.

With this object in view the invention consists in the novel construction and combinations of parts, which will be hereinafter more fully set forth.

Figure 1:
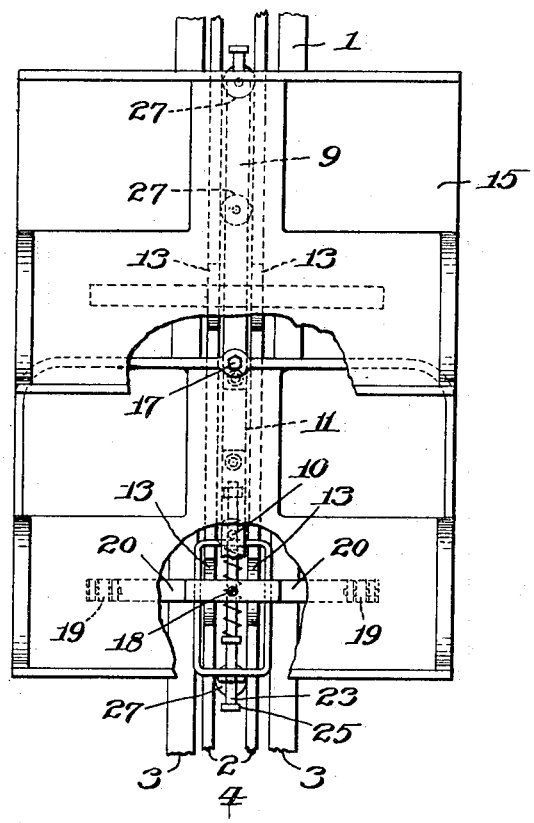
Figure 2:
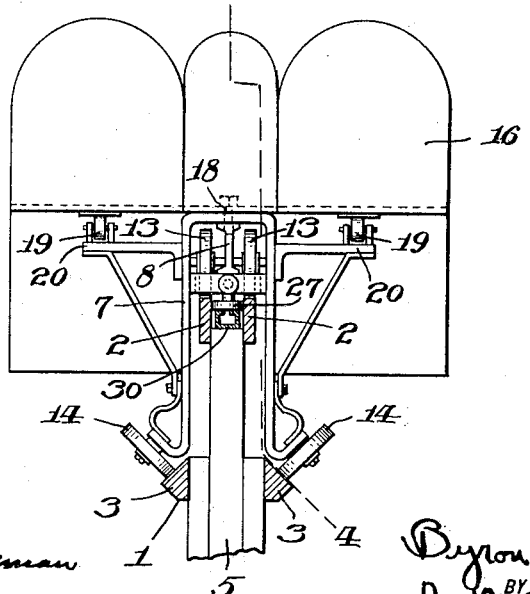
Figure 3:
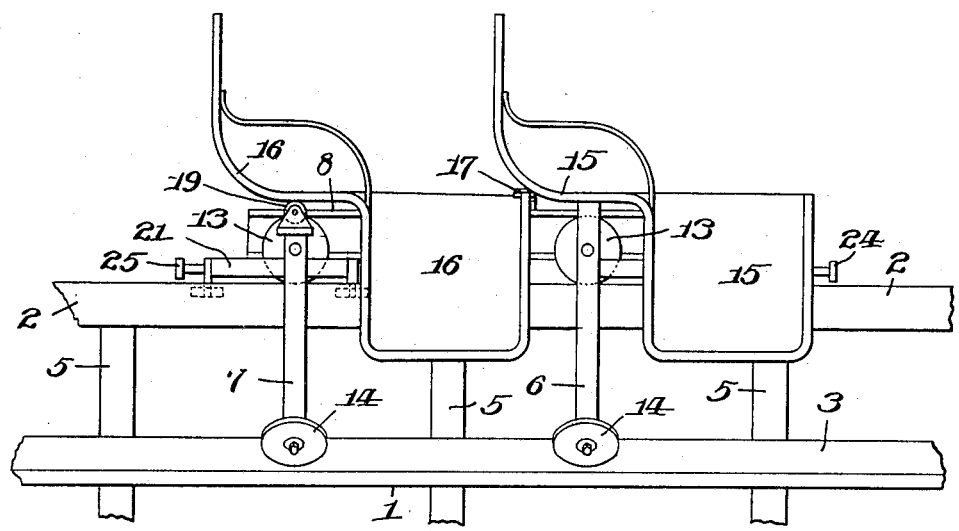
Figure 4:
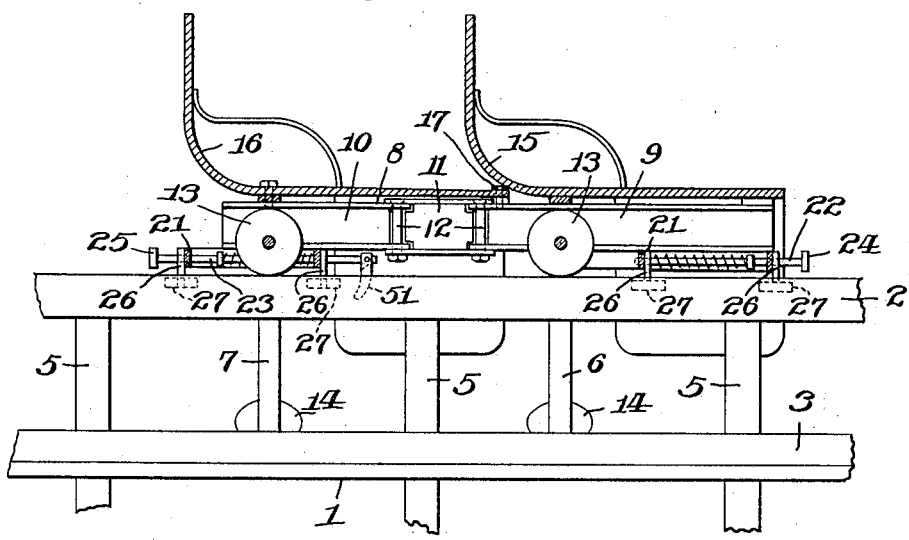

In the drawings, Figure 1 is a plan view of a portion of the trackway having one of the carriages mounted thereon, the latter being shown partly broken away. Fig. 2 is a transverse section of the trackway, showing one of the carriages mounted thereon. Fig. 3 is a side elevation of a portion of the trackway, showing one of the carriages mounted thereon. Fig. 4 is a vertical section as on the line 4 4 of Fig. 2. Fig. 5 is a longitudinal vertical section showing a portion of the conveyer-chain, the guide-channel therefor, and the lug for engaging the chain with the carriage. Fig. 6 is a sectional plan thereof. Fig. 7 is a sectional plan of the guide-channel, showing the conveyer-chain engaged therewith. Fig. 8 is an end elevation of Fig. 5. Fig. 9 is a diagrammatic view in plan of the configuration of the trackway and the mechanism for moving the carriages up the ascending incline, the supporting structure being omitted for clearness. Fig. 10 is an end elevation of Fig. 9. Fig. 11 is an enlarged elevation of one of the sprocket-wheels for engaging the conveyer-chain. Fig. 12 is a vertical section thereof.

1 designates my improved trackway, which in its preferred form comprises two pairs of rails 2 and 3, supported one pair above the other by the framework 5, as shown in Figs. 1, 2, 3, and 4. The carriage which I employ on the trackway is constructed to adapt itself to the various curves of the latter, and thereby insure the easy running of the carriage over the curved portions of the trackway as well as the straight portions thereof. This carriage in its preferred embodiment is as follows: 6 and 7 designate two frames, which are connected together by a jointed beam 8, which comprises the front and rear sections 9 and 10 and the intermediate section 11, the three sections being hingedly connected by suitable bolts 12. The frame 6 is secured to the front section 9 and extends downwardly on the respective sides of the rails 2, and the frame 7 is secured to the rear section 10, and it also extends downwardly on the respective sides of the rails 2. Each of the frames 6 and 7 is provided with a pair of supporting-wheels 13, which are adapted to run upon the rails 2, and the lower ends of the respective sides of each of the frames 6 and 7 are provided with wheels 14, which take against the inclined faces of the rails 3, and thereby prevent lateral tilting. 15 and 16 designate the front and rear carriage-bodies, respectively, each of which extends over the jointed beam 8 and downwardly on the respective sides thereof. The front body 15 is rigidly secured to the top of the frame 6 and the front section 9 of the jointed beam 8, and the rear body 16 is pivoted, as at 17, to the front section 9 of the jointed beam and, as at 18, to the top of the frame 7. The rear body 16 is supported against lateral tilting by rollers 19, carried by extensions 20 on the rear frame 7. The front and rear sections 9 and 10 of the jointed beam are provided with frames 21, to which are slidingly fitted the spring-actuated rods 22 and 23 of the usual buffers 24 and 25, respectively. Projecting downwardly from these frames 21 are studs 26, carrying rollers 27, which are arranged between the rails 2.

By the foregoing description it will be seen that the rollers 27, running between the rails 2, will cause the jointed beam 8 to follow the curvature of the trackway 1, and thereby adjust the frames 6 and 7 to bring the axes of the supporting-wheels 13 substantially parallel to the radial lines of the curves of the trackway, thus insuring the easy running of the carriage around said curves. The pivotal connections 17 and 18 of the rear carriage-body 16 with the front section 9 of the jointed beam and with the rear frame 7 make the entire carriage very flexible and permit the jointed beam to readily follow the curves of the trackway.

The configuration of the trackway is as follows: Referring to Figs. 9 and 10, 28 designates the ascending portion of the trackway, and 29 the descending portion thereof. The upper and lower ends of the two sections of trackway are connected together, as is usual in gravity-railways, whereby when a carriage is moved up the ascending portion 28 and introduced to the descending portion 29 it will be returned on the latter by gravity to the bottom of the ascending portion 28. The ascending portion 28 of the trackway is not only inclined upwardly, but it is also curved laterally, and in the present instance this portion of the trackway as it inclines upwardly turns a complete circle, and thereby forms a spiral, as clearly shown in the drawings. The descending portion of the trackway may be of the configuration shown in the drawings or of any desired configuration. The ascending portion of the trackway may also be varied without departing from the invention, the essential elements being the upwardly-inclined and laterally-curved trackway in combination with means for moving carriages up said incline, which latter element in its preferred form I shall now proceed to describe.

Referring to Figs. 5, 6, 7, 8, 9, 10, 11, and 12, 30 designates a chain-receiving channel, rectangular in cross-section and arranged between the rails 2 of the trackway. The top of the channel 30 is provided with a longitudinal slot 31, which extends the entire length thereof. This channel is made to conform to the configuration of the ascending incline 28 of the trackway, and it extends therethrough from the point marked $x$ to the point marked $z$ in Figs. 9 and 10. Arranged within the channel 30 is a suitable chain 32, which travels upward through the channel and around suitably-located sprocket-wheels 33, 34, and 35, the wheel 33 directing the chain to enter the lower end of the channel, the wheel 34 drawing the chain up through the channel, and the wheel 35 directing the chain from the wheel 34 to the wheel 33.

The shaft 36 of the sprocket-wheel 34 may be driven in any suitable manner. In the present instance one end of this shaft extends outwardly and is provided with a sprocket-wheel 37, which is driven by a chain 38, passing around a sprocket-wheel 39 on a shaft 40, which latter shaft is driven by a suitable motor 41.

The chain 32 comprises a series of links 42, arranged at intervals and connected by the intermediate links 43. Each link 43 is of the following construction: 44 designates a block, preferably of wood, around which passes a strap or band 45. This strap or band is fitted to grooves in the sides of the block and extends slightly beyond the respective ends of the block to receive the swiveled ends of eyes 46, to which the intermediate links 42 are attached. Fitted to a central opening in the block 44 and extending beyond the outside line thereof is an antifriction-roller 47, which is adapted to take against the inside vertical wall of the channel 30 as the chain 32 is drawn therethrough. It will be observed on reference to Fig. 7 that the intermediate links 43 do not contact with the walls of the channel. In order to reduce friction between the links 42 and either the top or bottom of the channel 30, I provide each of said links with brackets 48, in which are rotatably mounted a pair of rollers 49, which extend transversely across the top and bottom of the block, as shown.

The sprocket-wheels 33, 34, and 35 are provided with forked arms 50, as shown in Figs. 11 and 12, which engage the links 42 to drive the chain 32.

The rear buffer-rod 23 of the carriage is provided with a depending lug 51, which is adapted to enter the channel 30 and extend through the slot 31 in the top thereof. The lower end of this lug is forked to straddle the links 43 and to be engaged by the block 44 of one of the links 42, to the end that as the chain 32 is drawn up through the channel the carriage will be moved up the ascending portion of the trackway and started down the descending portion thereof.

While my invention is herein shown and described in a desirable and practicable form, yet I do not limit myself to this particular construction, as the same may be greatly modified without departing from the invention.

I claim—

1. In a gravity-railway the combination of a trackway including in its configuration an upwardly-inclined and laterally-curved portion, a channel arranged substantially parallel to said trackway, a flexible conveyer provided with antifriction-rollers, means for moving said conveyer through said channel, a carriage adapted to run on said trackway, and means for engaging said carriage with said conveyer.

2. In a gravity-railway, the combination of a trackway including in its configuration an upwardly-inclined spiral portion a carriage adapted to run thereon, a flexible conveyer provided with antifriction-rollers, a guide-channel for the conveyer arranged parallel to said portion of trackway, means for engaging the carriage with the conveyer, and means for moving the conveyer through the channel.

3. In a gravity-railway, the combination with a conveyer-chain including a series of links each of which is provided with two antifriction-rollers journaled at right angles to each other, of a channel, and means for moving the chain through the channel.

4. The combination of a laterally-curved trackway, and a carriage adapted to run thereon, said carriage comprising a jointed beam, supporting-wheels connected thereto, a body portion pivotally connected to the jointed beam and means for causing said jointed beam to follow the curvature of the trackway.

5. The combination of a laterally-curved trackway, and a carriage adapted to run thereon, said carriage comprising a jointed beam provided with lateral extensions, supporting-wheels connected to said beam, rollers carried by said extensions, a body portion pivotally connected to said beam and resting upon said rollers, and means for causing said jointed beam to follow the curvature of the trackway.

6. The combination of a laterally-curved trackway including a pair of parallel rails, and a carriage adapted to run thereon, said carriage comprising a jointed beam, supporting-wheels connected thereto, a body portion connected to the jointed beam, and horizontally-arranged rollers connected to the jointed beam and arranged to travel between said rails whereby the jointed beam is caused to follow the curvature of the trackway.

In testimony whereof I affix my signature in presence of two witnesses.

BYRON B. FLOYD.

Witnesses:
ANDREW V. GROUPE,
RALPH H. GAMBLE.